(12) United States Patent
Wang

(10) Patent No.: US 11,347,021 B2
(45) Date of Patent: May 31, 2022

(54) LENS MODULE AND ELECTRONIC DEVICE

(71) Applicant: AAC Optics Solutions Pte. Ltd., Singapore (SG)

(72) Inventor: Hailong Wang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 15 days.

(21) Appl. No.: 16/916,088

(22) Filed: Jun. 29, 2020

(65) Prior Publication Data
US 2020/0409021 A1 Dec. 31, 2020

(30) Foreign Application Priority Data

Jun. 30, 2019 (WO) ................ PCT/CN2019/094068

(51) Int. Cl.
| | | |
|---|---|---|
| *G02B 7/02* | (2021.01) | |
| *G02B 7/04* | (2021.01) | |
| *H04N 5/225* | (2006.01) | |
| *G02B 13/00* | (2006.01) | |
| *G02B 27/00* | (2006.01) | |

(52) U.S. Cl.
CPC ............. *G02B 7/023* (2013.01); *G02B 7/021* (2013.01); *G02B 7/04* (2013.01); *H04N 5/2254* (2013.01); *G02B 13/001* (2013.01); *G02B 27/0018* (2013.01)

(58) Field of Classification Search
CPC ........ G02B 7/021; G02B 7/022; G02B 7/023; G02B 7/025; G02B 7/026; G02B 7/02; G02B 7/003; G02B 13/0015; G02B 13/0045; G02B 7/04; G02B 27/0018; H04N 5/2254
See application file for complete search history.

(56) References Cited

U.S. PATENT DOCUMENTS

| | | | | |
|---|---|---|---|---|
| 2010/0214677 A1* | 8/2010 | Monti | .................... | G02B 7/026 |
| | | | | 359/820 |
| 2018/0348479 A1* | 12/2018 | Kasama | ............. | G02B 27/0018 |
| 2020/0285029 A1* | 9/2020 | Watanabe | .............. | G02B 7/026 |

FOREIGN PATENT DOCUMENTS

| | | |
|---|---|---|
| CN | 208026946 A1 | 10/2018 |
| CN | 208636497 A1 | 3/2019 |
| JP | 2006222473 A1 | 8/2006 |

(Continued)

OTHER PUBLICATIONS

2nd Office Action dated Jul. 2, 2021 by JPO in related Japanese Patent Application No. 2020-113566 (8 Pages).

*Primary Examiner* — Ephrem Z Mebrahtu
(74) *Attorney, Agent, or Firm* — W&G Law Group

(57) ABSTRACT

The present disclosure provides a lens module, including a stopper for fixing the lens group. The lens barrel includes a barrel wall abutting against the stopper, the stopper fixes, from an image side surface of the lens group, the lens group in the lens barrel, where the stopper includes a mounting surface arranged opposite to the lens group. The mounting surface includes an abutting surface and a stopper surface, the abutting surface abuts against the lens group, the stopper surface is disposed separately form the lens group, and a distance between the stopper surface and the lens group along a direction parallel to an optical axis is less than or equal to 5 μm. A stability of the lens module is improved and an imaging quality of the lens module and an electronic device using the lens module is ensured.

7 Claims, 5 Drawing Sheets

(56) References Cited

FOREIGN PATENT DOCUMENTS

| | | | |
|---|---|---|---|
| JP | 2009251401 | A1 | 10/2009 |
| JP | 2016004233 | A1 | 1/2016 |
| JP | 2018097344 | A1 | 6/2018 |
| JP | 2019032507 | A1 | 2/2019 |

* cited by examiner

LENS MODULE AND ELECTRONIC DEVICE

TECHNICAL FIELD

The present disclosure relates to optical imaging technology, in particular to a lens module and an electronic device.

BACKGROUND

With the continuous development of science and technology, electronic devices are continuously developed towards intelligence. In addition to a digital camera, a portable electronic device such as a tablet computer and a mobile phone is also equipped with a lens module having a photo shooting and image shooting function. Therefore, the design of the lens module has always been the key to imaging quality of such products.

The existing lens module generally includes a lens barrel, a lens group arranged in the lens barrel, and a stopper for fixing the lens group in the lens barrel. The stopper is fixed on the lens barrel through dispensing and abuts against the lens group, thereby fixing the lens group in the lens barrel. However, the stopper may be deformed by a torque generated by a force of the lens group and a glue, and a deformation amount may reach 15-20 µm, which reduces an overall reliability and the imaging quality of the lens module.

Therefore, it is necessary to provide a lens module and an electronic device with a more stable structure.

SUMMARY

An objective of the present disclosure is to provide a lens module and an electronic device to solve a problem of a severe deformation of a stopper of the existing lens module.

A technical solution of the present disclosure is as follows:

A lens module is provided, including a lens barrel provided with a light-through hole, a lens group arranged in the lens barrel, and a stopper for fixing the lens group. The lens barrel includes a barrel wall abutting against the stopper, the stopper fixes, from an image side surface of the lens group, the lens group in the lens barrel. The stopper includes a mounting surface arranged opposite to the lens group, the mounting surface includes an abutting surface and a stopper surface, the abutting surface abuts against the lens group, the stopper surface is disposed separately from the lens group, and a distance between the stopper surface and the lens group along a direction parallel to an optical axis is less than or equal to 5 µm.

Optionally, the stopper surface is closer to an object side relative to the abutting surface, and the abutting surface is closer to the optical axis relative to the stopper surface.

Optionally, the mounting surface is further provided with a groove, the groove is an annular groove, and the groove is located between the abutting surface and the stopper surface.

Optionally, the stopper further includes an outer side surface abutting against the barrel wall, and the mounting surface further includes a transition surface connecting the stopper surface and the outer side surface.

Optionally, the barrel wall includes an inner surface close to the optical axis, the stopper includes an outer side surface arranged opposite to the inner surface, the outer side surface includes a first outer side surface and a second outer side surface, the first outer side surface abuts against the inner surface, and a glue groove is formed between the second outer side surface and the inner surface.

Optionally, the second outer side surface is inclined from an object side to an image side and in a direction close to the optical axis.

Optionally, part of the first outer side surface abuts against the inner surface.

Optionally, the outer side surface includes a third outer side surface, the third outer side surface connects the first outer side surface and the second outer side surface, and the third outer side surface is perpendicular to the optical axis.

Optionally, the inner surface includes a contact surface and a dilating surface which are arranged stepwise along a direction perpendicular to the optical axis, the contact surface abuts against the first outer side surface, and the glue groove is formed between the dilating surface and the second outer side surface.

In addition, the present disclosure further provides an electronic device, including the lens module according to any one of the above.

The present disclosure has beneficial effects as follows: with respect to the above lens module, the mounting surface of the stopper arranged opposite to the lens group includes an abutting surface and a stopper surface. The abutting surface abuts against the lens group, the stopper surface is disposed separately from the lens group, and the distance between the stopper surface and the lens group along the direction parallel to the optical axis is less than or equal to 5 µm. When the stopper is stressed and a deformation amount exceeds the distance between the stopper surface and the lens group, the stopper surface of the stopper abuts against the lens group, and the lens group can limit a further deformation of the stopper, so that the deformation amount of the stopper is controlled below 5 µm to improve stability of the lens module and ensure the imaging quality of the lens module and an electronic device using the lens module.

DETAILED DESCRIPTION

The present disclosure will be further illustrated below with reference to the drawings and embodiments.

Figure 1:
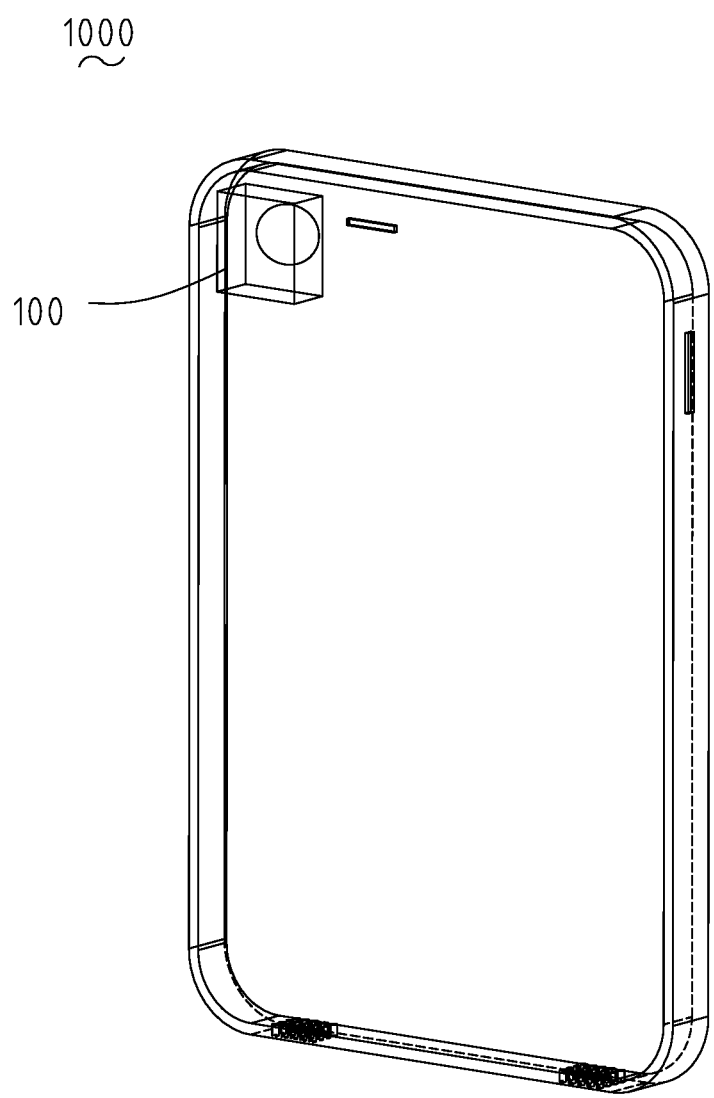
FIG. 1 is a schematic structural diagram of an electronic device in an embodiment of the present disclosure.

As shown in FIG. 1, an embodiment of the present disclosure provides an electronic device 1000 with a lens module 100. The electronic device 1000 may be a mobile phone or a tablet computer.

Figure 2:
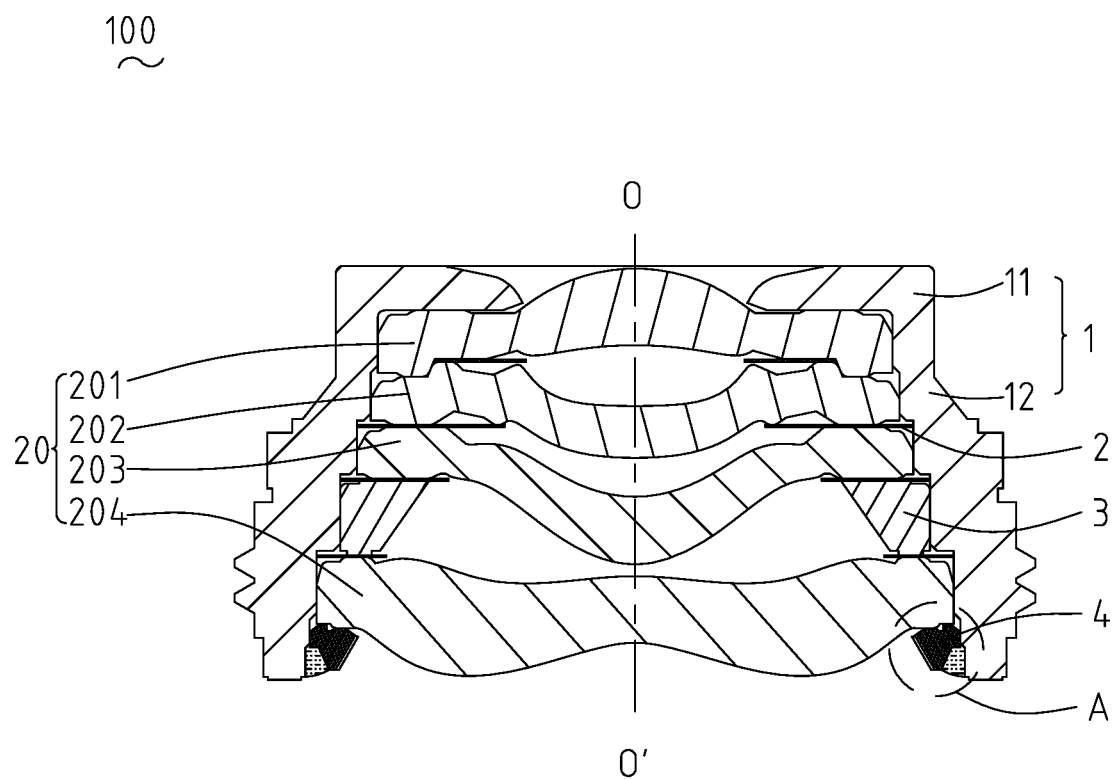
FIG. 2 is a schematic cross-sectional view of a lens module in FIG. 1.

Referring to FIG. 2, the lens module 100 includes a lens barrel 1 having a cavity, a lens group 20, a light shielding sheet 2, a light shielding plate 3, and a stopper 4.

Figure 4:
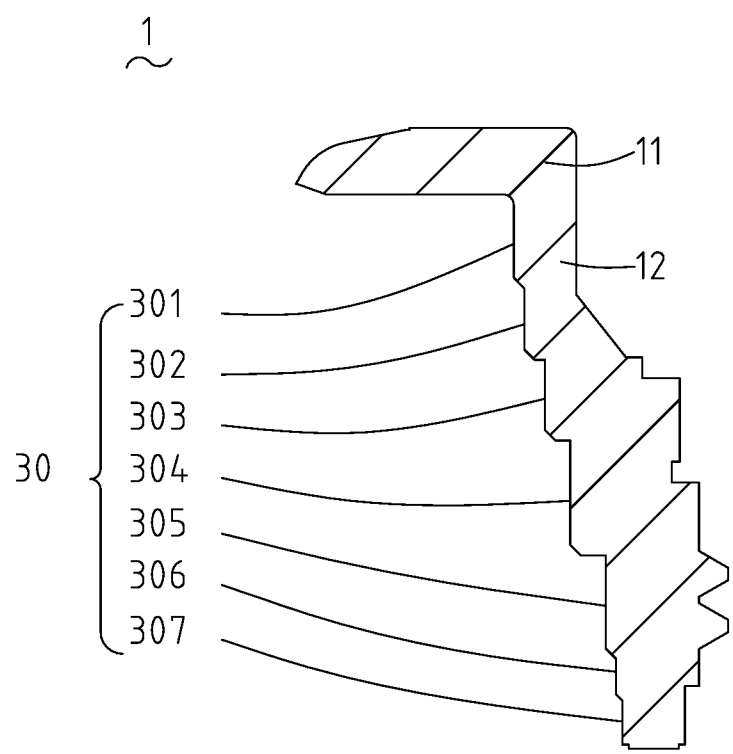
FIG. 4 is a schematic structural diagram of a lens barrel in FIG. 2.

The lens barrel 1 includes a top wall 11 defining a light-through hole, and a barrel wall 12 bent and extending from an edge of the top wall 11. The top wall 11 and the barrel wall 12 are connected and define to form a cavity. Also referring to FIG. 4, the barrel wall 12 includes an inner surface 30 close to an optical axis OO'. The inner surface 30 includes a dilating surface 307 and a plurality of contact surfaces contacting the lens group 20, which are arranged stepwise along a direction perpendicular to the optical axis OO'. In the direction from an object side to an image side, the inner surface 30 includes a first contact surface 301, a second contact surface 302, a third contact surface 303, a fourth contact surface 304, a fifth contact surface 305, and a sixth contact surface 306 sequentially arranged. The dilating surface 307 is connected to the sixth contact surface 306.

In this embodiment, as shown in FIG. 2, the lens group 20 includes four lenses, namely, a first lens 201, a second lens 202, a third lens 203, and a fourth lens 204, which are sequentially accommodated in the cavity from the object side to the image side. The first lens 201, the second lens 202, the third lens 203, and the fourth lens 204 respectively abut on the first contact surface 301, the second contact surface 302, the third contact surface 303, and the fifth contact surface 305. The light shielding plate 3 is arranged between the third lens 203 and the fourth lens 204, and the light shielding plate 3 abuts on the fourth contact surface 304. The number of the light shielding sheet 2 is four, and the four light shielding sheets 2 are respectively sandwiched between two adjacent lenses or between the light shielding plate 3 and its adjacent lens.

Figure 3:
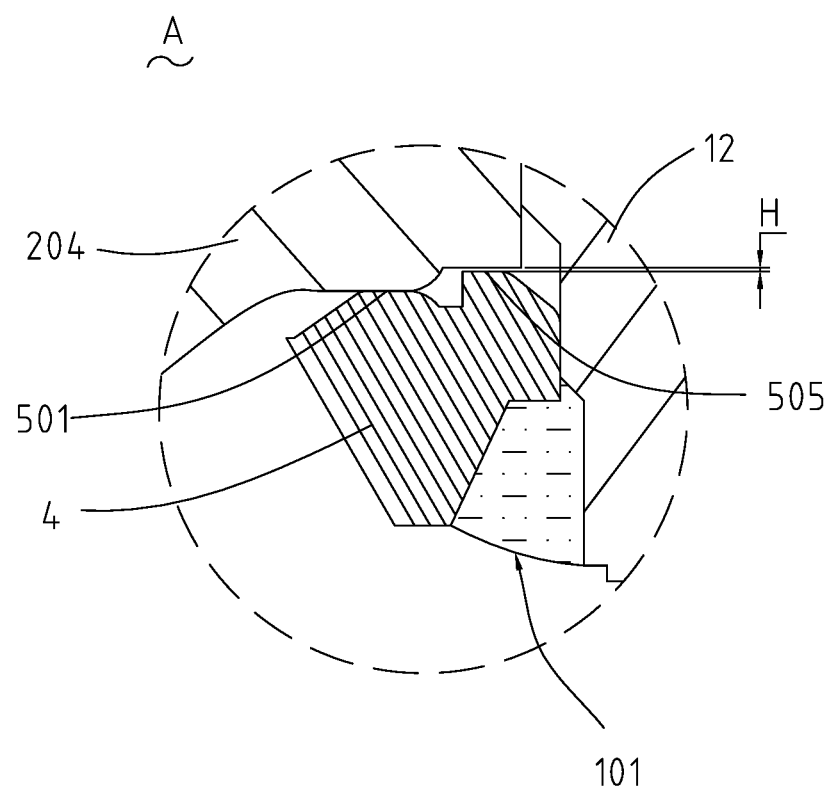
FIG. 3 is an enlarged view of a partial structure at A section in FIG. 2.
Figure 5:
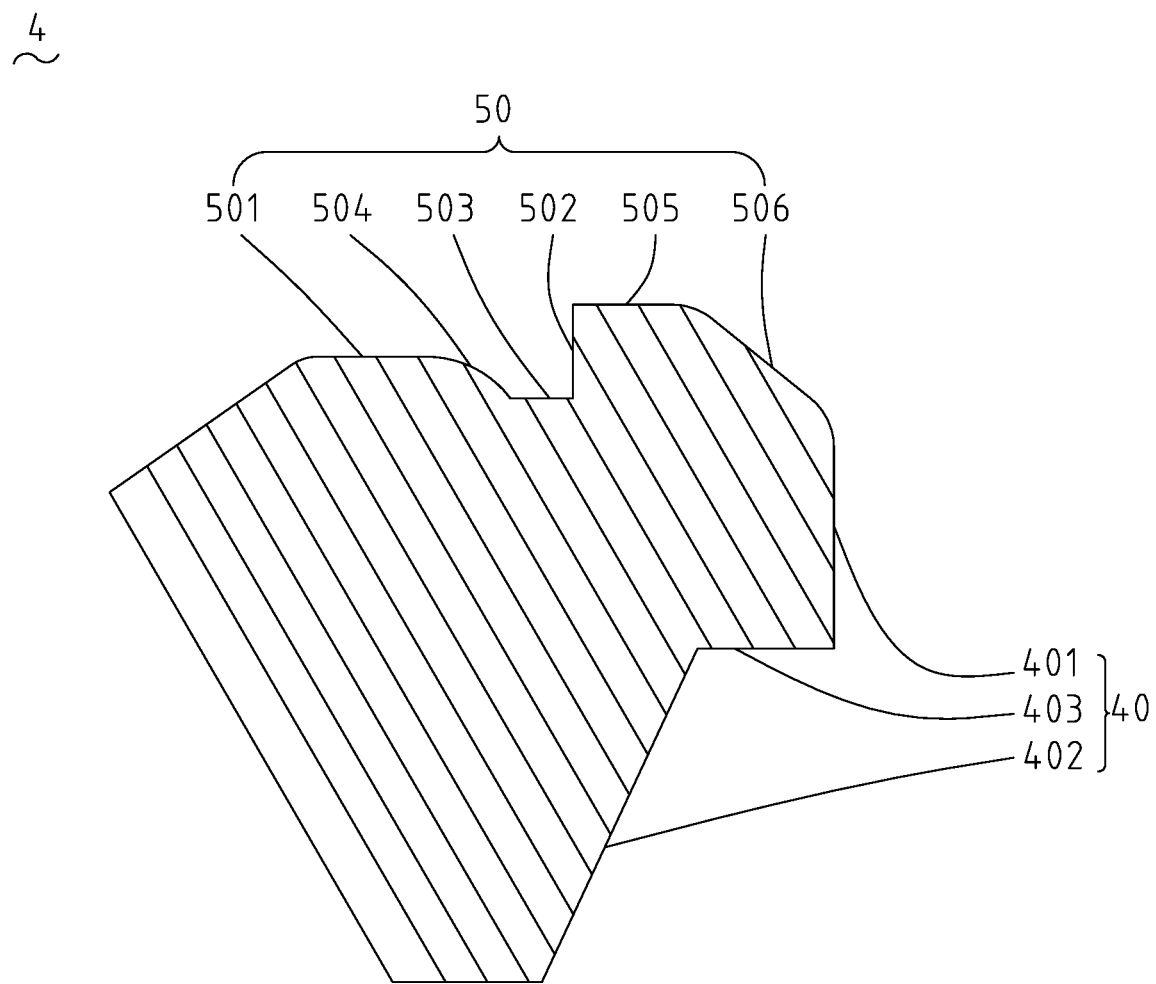
FIG. 5 is a schematic structural diagram of a stopper in FIG. 3.

The stopper 4 is press-fitted on the lens barrel 1 and is located on the image side of the fourth lens 204. As shown in FIG. 3, the stopper 4 includes a mounting surface 50 arranged opposite to the fourth lens 204, and the mounting surface 50 abuts on the fourth lens 204. Also referring to FIG. 5, the mounting surface 50 includes an abutting surface 501 and a stopper surface 505. The abutting surface 501 is closer to the optical axis OO' relative to the stopper surface 505. The abutting surface 501 abuts against the fourth lens 204. The stopper surface 505 is disposed separately from the fourth lens 204, and a distance H between the stopper surface 505 and the fourth lens 204 along the direction parallel to the optical axis OO' is less than or equal to 5 μm.

Since the distance H between the stopper surface 505 and the fourth lens 204 along the direction parallel to the optical axis OO' is less than or equal to 5 μm, the stopper surface 505 abuts against the fourth lens 204 when the stopper 4 is subjected to a force of both the lens group 20 and a glue and is deformed and a deformation amount of the stopper 4 in the direction parallel to the optical axis OO' is greater than the distance H, so that a further deformation of the stopper 4 can be limited, thereby improving stability of the lens module 100 and ensuring imaging quality.

Optionally, the stopper surface 505 is closer to the object side relative to the abutting surface 501, so that, on a premise of ensuring a contact area between the stopper 4 and the barrel wall 12, a depth of the glue groove 101 may be increased so as to increase the contact area of the glue with the stopper 4 and the barrel 1 and ensure a thrust, thus increasing the stability of the lens module.

Optionally, the mounting surface 50 is further provided with a groove. The groove is an annular groove. An inner wall of the groove includes a first groove surface 502 extending from the stopper surface 505 toward the image side along the direction parallel to the optical axis OO', a second groove surface 503 extending from the first groove surface 502 along the direction perpendicular to the optical axis OO' and toward the direction close to the optical axis OO', and a third groove surface 504 obliquely extending from the second groove surface 503 toward the object side. The groove provides a deformable space for the stopper 4 when the stopper 4 is subjected to a pressing force and is deformed, and improves a structural strength of the stopper 4. Moreover, in this embodiment, the third groove surface 504 is an arc surface to avoid a stress concentration.

Optionally, the stopper 4 further includes an outer side surface 40 abutting against the sixth contact surface 306, and the mounting surface 50 further includes a transition surface 506. The transition surface 506 connects the stopper surface 505 and the outer side surface 40, and the transition surface 506 is inclined from the stopper surface 505 towards the direction away from the optical axis OO'. After the transition surface 506 is provided, only a part of the stopper surface 505 needs to be finished to ensure a uniform gap between the stopper surface 505 and the fourth lens 204 and reduce a processing cost.

Optionally, the outer side surface 40 includes a first outer side surface 401 and a second outer side surface 402. The first outer side surface 401 abuts against the sixth contact surface 306. The glue groove 101 is formed between the second outer side surface 402 and the dilating surface 307 to increase the contact area of the glue with the stopper 4 and the lens barrel 1.

Further, the sixth contact surface 306 abuts against part of the first outer side surface 401, which may further increase the contact area of the glue with the stopper 4 and the lens barrel 1. Moreover, the second outer side surface 402 is inclined from the object side to the image side and in the direction close to the optical axis OO', which may further increase the contact area of the glue with the stopper 4 and the lens barrel 1.

Further, the outer side surface 40 further includes a third outer side surface 403. The third outer side surface 403 connects the first outer side surface 401 and the second outer side surface 402, and the third outer side surface 403 is perpendicular to the optical axis OO', which may further increase the contact area of the glue with the stopper 4 and the lens barrel 1.

It is worth mentioning that in this embodiment, the lens group 20 includes four lenses. It can be understood that, in other embodiments, the number of the lenses may alternatively be changed according to actual needs.

The description above is merely embodiments of the present disclosure, and it should be pointed out that, those of ordinary skills in the art may make improvements without departing from the inventive concept of the present disclosure, but these all belong to the protection scope of the present disclosure.

What is claimed is:

1. A lens module, comprising a lens barrel provided with a light through hole, a lens group arranged in the lens barrel, and a stopper for fixing the lens group, wherein the lens barrel comprises a barrel wall abutting against the stopper, the stopper fixes, from an image side surface of the lens group, the lens group in the lens barrel, wherein the stopper comprises a mounting surface arranged opposite to the lens group, the mounting surface comprises an abutting surface and a stopper surface, the abutting surface abuts against the lens group, the stopper surface is disposed separately from the lens group, and a distance between the stopper surface and the lens group along a direction parallel to an optical axis is between 0-5 μm;

the stopper surface is located on one side of the abutting surface towards the lens group; the mounting surface is further provided with an annular groove located between the abutting surface and the stopper surface; the abutting surface is located on one side of the groove away from the lens barrel and the stopper surface is located on one side of the groove away from the optical axis;

the barrel wall comprises an inner surface facing the lens group, the stopper further comprises an outer side surface arranged opposite to the inner surface, the outer side surface comprises a first outer side surface and a second outer side surface, the first outer side surface abuts against the inner surface, and a glue groove is formed between the second outer side surface and the inner surface.

2. The lens module according to claim 1, wherein the mounting surface further comprises a transition surface connecting the stopper surface and the outer side surface.

3. The lens module according to claim 2, wherein the second outer side surface is inclined from an object side to an image side and towards the optical axis.

4. The lens module according to claim 2, wherein part of the first outer side surface abuts against the inner surface.

5. The lens module according to claim 2, wherein the outer side surface further comprises a third outer side surface, the third outer side surface connects the first outer side surface and the second outer side surface, and the third outer side surface is perpendicular to the optical axis.

6. The lens module according to claim 2, wherein the inner surface comprises a contact surface and a dilating surface which are arranged stepwise along a direction perpendicular to the optical axis, the contact surface abuts against the first outer side surface, and the glue groove is formed between the dilating surface and the second outer side surface.

7. An electronic device, comprising a lens module as described in claim 1.

* * * * *